Figure 4:
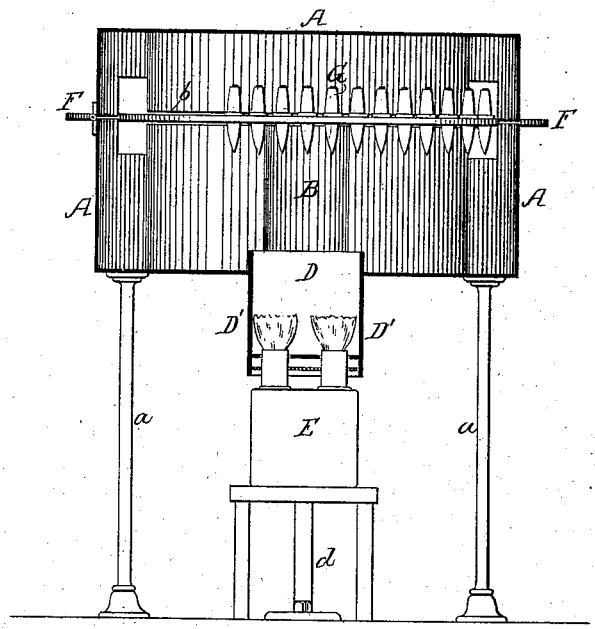

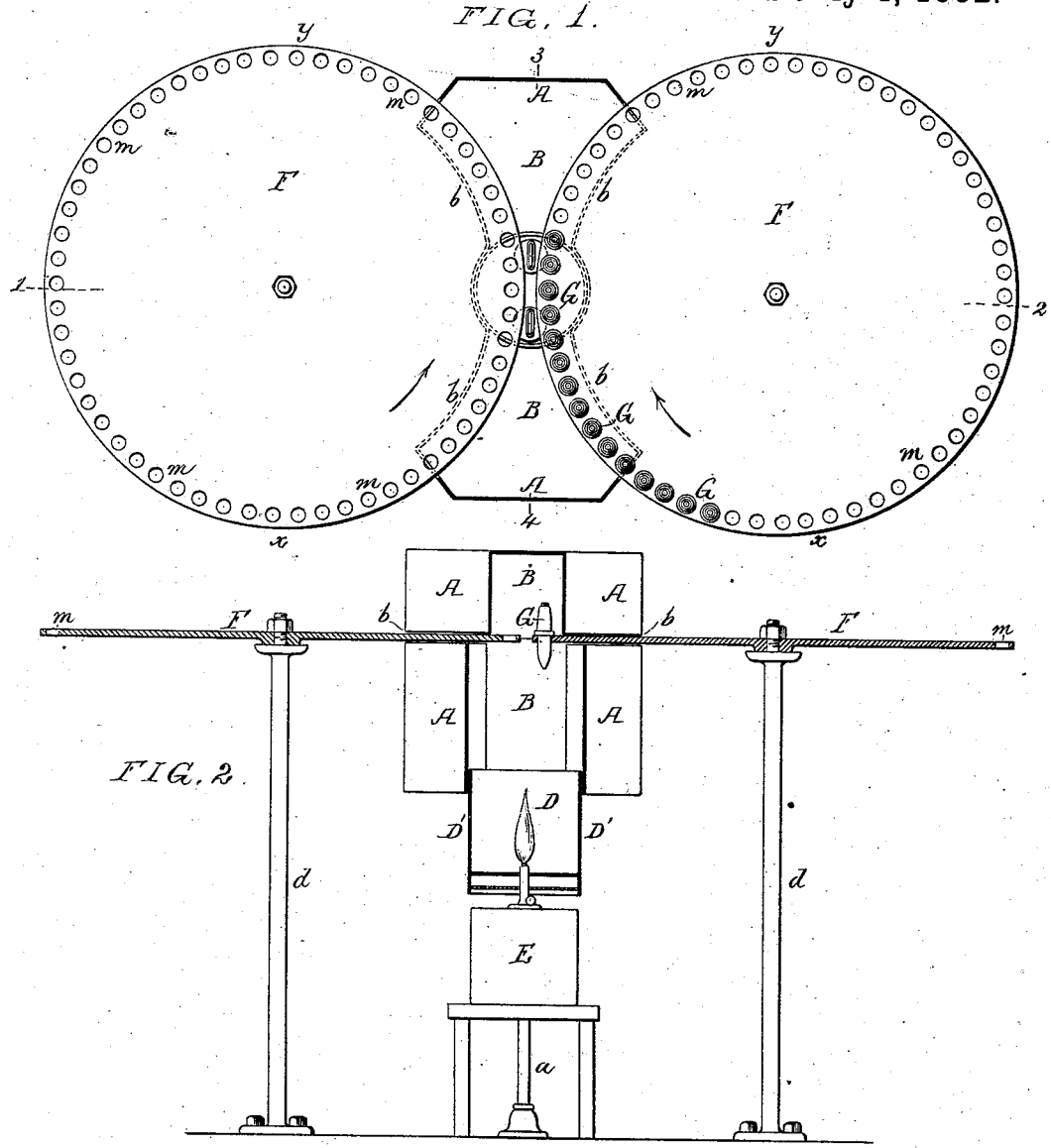

(No Model.) 2 Sheets—Sheet 2.

J. J. BACH.
FORMING AND DRYING CIGAR BUNCHES.

No. 260,638. Patented July 4, 1882.

Witnesses:
Harry Drury
Harry Smith

Inventor:
J. J. Bach
by his Attorneys
Howson and Sons

UNITED STATES PATENT OFFICE.

JOHN J. BACH, OF PHILADELPHIA, PENNSYLVANIA.

FORMING AND DRYING CIGAR-BUNCHES.

SPECIFICATION forming part of Letters Patent No. 260,638, dated July 4, 1882.

Application filed November 14, 1881. (No model.)

*To all whom it may concern:*

Be it known that I, JOHN J. BACH, a subject of the Emperor of Germany, and a resident of Philadelphia, Pennsylvania, have invented certain Improvements in Forming and Drying Cigar-Bunches, of which the following is a specification.

The object of my invention is to so treat a bunch or roll of tobacco designed for a cigar that it will be thoroughly dried before the application of the wrapper, and will retain its shape while said wrapper is being applied. This object I attain in the manner which I will now proceed to describe, reference being had to the accompanying drawings, in which—

Figure 1, Sheet 1, is a sectional plan view of apparatus for carrying out my invention; Fig. 2, a longitudinal section of the same on the line 1 2; Fig. 3, a section of one of the molds on an enlarged scale; and Fig. 4, Sheet 2, a transverse section of Fig. 1 on the line 3 4.

A is a casing, preferably of sheet metal, which incloses a chamber, B, closed at the top and communicating below with the combustion-chamber D of a lamp, E, the casing D' of said chamber fitting snugly to the casing A. The said casing A is supported upon suitable legs, $a$, at the ends, and has in its opposite sides slots $b$, through which and into the chamber B project portions of a pair of disks, F, the latter being hung to the upper ends of vertical rods $d$, arranged one on each side of the casing A, the disks being free to turn on said rods.

Around each disk, near the outer edge of the same, is a row of openings, $m$, each adapted for the reception of a mold, G, Fig. 3, consisting of a lower cup-shaped portion, $g$, and an upper tubular portion or cap, $g'$, the lower portion, $g$, of the mold having a flange, $i$, for resting on the disk F, and the upper portion or cap, $g'$, being open at both ends.

The leaves of tobacco bunched into shapes approximating to those of the desired cigars are brought to attendants who occupy positions at $x$ $x$, and who take the bunches of tobacco one after another, insert the pointed end of each bunch into the lower half, $g$, of one of the molds, apply the upper half or cover, $g'$, to the projecting portion of the bunch, and insert the molds in succession into the openings $m$ in the disks F, the disks being slowly rotated in the direction of the arrows as the molds are inserted.

The filled molds are thus caused to pass through the chamber B, where they are subjected to the heat derived from the flames of the lamp E, the bunches of tobacco in the molds being thus dried and in a measure set, so as to retain the shape imparted to them by the molds, the moisture escaping from the upper ends of the bunches, which are not confined by the caps $g'$ of the molds.

The slots $b$ in the casing A are enlarged at each end, so as to permit the free entrance of the molds into and their egress from the chamber B, and as the molds emerge from said chamber they are taken from the disks F by attendants stationed at $y$ $y$, the bunches of tobacco removed from the molds, and the wrappers are applied.

Although I have shown and described a lamp as the means for heating the chamber B, and although I prefer this means on account of its availability and convenience, the chamber may be otherwise heated, if desired.

The casing A of the chamber is made in two parts, separated on a line passing through the slots $b$, as observed in Fig. 4, the upper part of the casing being hinged to the lower part, so that it can be thrown back when the chamber B becomes too highly heated or when access has to be had to the interior of the said chamber. Instead of being hinged, the upper half of the casing may be free to be lifted vertically from the lower part, being secured in position by suitable catches when adjusted.

A single disk F only or more than two disks may be used in connection with the heating-chamber B, as circumstances may suggest. The arrangement shown is preferred, however, as practice has proven its convenience and efficiency.

I do not desire to claim broadly the confinement of cigar-bunches in heated molds; but

I claim as my invention and desire to secure by Letters Patent—

1. The mode herein described of setting and drying bunches of tobacco for cigars, said mode consisting in confining the bunches in molds, and then slowly passing the molds, with their contents, through a heated chamber, as set forth.

2. The combination of a casing, A, having a slot, b, means of heating the chamber B, inclosed by the casing, and a rotating disk, F, projecting into said chamber B, and adapted for the reception of a series of molds, G, as set forth.

3. The combination of the chamber B, having a slotted casing, A, the mold-carrying disk or disks F, the lamp E, and the combustion-chamber D of the latter communicating with the chamber B, as specified.

4. The combination of the mold-carrying disk or disks F, the heating device, and a chamber, B, having a slotted casing with hinged or detachable upper portion, as specified.

5. The within-described mold, comprising the lower cup-shaped portion, g, with flange i, and the upper portion or cap, g', open at both ends, as set forth.

In testimony whereof I have signed my name to this specification in the presence of two subscribing witnesses.

JOHN J. BACH.

Witnesses:
HARRY DRURY,
HARRY SMITH.